United States Patent
Chen et al.

(10) Patent No.: US 11,182,644 B2
(45) Date of Patent: Nov. 23, 2021

(54) METHOD AND APPARATUS FOR POSE PLANAR CONSTRAINING ON THE BASIS OF PLANAR FEATURE EXTRACTION

(71) Applicant: Beijing Institute of Technology, Beijing (CN)

(72) Inventors: Xiaopeng Chen, Beijing (CN); Qiang Huang, Beijing (CN); Siyuan Gou, Beijing (CN); Zhangguo Yu, Beijing (CN); Xuechao Chen, Beijing (CN); Junyao Gao, Beijing (CN); Yang Xu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 16/725,357

(22) Filed: Dec. 23, 2019

(65) Prior Publication Data
US 2021/0192271 A1    Jun. 24, 2021

(51) Int. Cl.
| | | |
|---|---|---|
| *G06K 9/00* | (2006.01) | |
| *G06K 9/62* | (2006.01) | |
| *G06T 1/00* | (2006.01) | |
| *G06K 9/46* | (2006.01) | |
| *G06T 3/00* | (2006.01) | |

(52) U.S. Cl.
CPC ......... *G06K 9/6218* (2013.01); *G06K 9/4652* (2013.01); *G06K 9/6251* (2013.01);
(Continued)

(58) Field of Classification Search
CPC .... G06K 9/4609; G06K 9/48; G06K 9/00228; G06K 9/00718; G06K 9/00797; G06K 9/6217; G06K 9/03; G06K 9/38; G06K 9/6218; G06K 9/4652; G06T 7/0083; G06T 5/006; G06T 5/20; G06T 1/60; G06T 11/60; G06T 11/001; G06T 3/00; G06T 3/40; G06T 3/60; G06T 2207/10016;
(Continued)

(56) References Cited

U.S. PATENT DOCUMENTS

| | | | | |
|---|---|---|---|---|
| 5,388,059 | A * | 2/1995 | DeMenthon | G06T 7/70 |
| | | | | 702/152 |
| 6,671,391 | B1 * | 12/2003 | Zhang | G06K 9/00228 |
| | | | | 382/118 |

(Continued)

*Primary Examiner* — Amir Alavi
(74) *Attorney, Agent, or Firm* — Cantor Colburn LLP

(57) ABSTRACT

The present application provides a method and apparatus for pose planar constraining on the basis of planar feature extraction, wherein the method includes: inputting the acquired RGB color image and point cloud image into spatial transformation network to obtain two-dimensional and three-dimensional affine transformation matrixes; extracting the planar features of the transformed two-dimensional affine transformation matrix and three-dimensional affine transformation matrix; inputting the acquired planar features into the decoder and obtain the pixel classification of the planar features; clustering the vectors corresponding to the planar pixels to obtain the segmentation result of the planar sample; using planar fitted by the segmentation result to make planar constraint to the pose calculated by vision algorithm. The application combines RGB-D information to perform plane extraction, and designs a new spatial transformation network to transform two-dimensional color image and three-dimensional point cloud image.

8 Claims, 3 Drawing Sheets

(52) U.S. Cl.
CPC .......... *G06K 9/6256* (2013.01); *G06T 1/0014* (2013.01); *G06T 3/0006* (2013.01)

(58) Field of Classification Search
CPC ............... G11B 27/28; G06F 17/30257; G06F 17/3024; G06F 17/3072; G06F 17/148; H04N 1/40062
See application file for complete search history.

(56) References Cited

U.S. PATENT DOCUMENTS

| | | | | |
|---|---|---|---|---|
| 6,944,319 B1* | 9/2005 | Huang | ............... | G06K 9/00288 382/118 |
| 7,580,774 B2* | 8/2009 | Goswami | ........... | G06K 9/00369 700/245 |
| 7,768,528 B1* | 8/2010 | Edwards | .............. | G11B 27/036 345/619 |
| 7,940,960 B2* | 5/2011 | Okada | .................. | G06K 9/6267 382/103 |
| 8,351,646 B2* | 1/2013 | Fujimura | .................. | G06T 7/75 382/103 |
| 9,466,013 B2* | 10/2016 | Sawhney | ............. | G06K 9/6218 |
| 9,868,212 B1* | 1/2018 | Hinterstoisser | ........ | B25J 9/1671 |
| 2008/0152191 A1* | 6/2008 | Fujimura | ........... | G06K 9/00214 382/103 |
| 2013/0181988 A1* | 7/2013 | Yoo | ....................... | G06K 9/6272 345/420 |
| 2020/0304773 A1* | 9/2020 | Tomkevicius | ....... | H04N 13/189 |

* cited by examiner

METHOD AND APPARATUS FOR POSE PLANAR CONSTRAINING ON THE BASIS OF PLANAR FEATURE EXTRACTION

TECHNICAL FIELD

The present application relates to the field of computer vision technology, and in particular, to a method and an apparatus for pose planar constraining based on planar feature extraction.

BACKGROUND

As a common indoor geometric feature, plane is widely used in robot positioning or navigation. In the scene with lack of texture, the vision-based robot positioning algorithm may have problems such as the accuracy of positioning and mapping decline, or even the failure of the algorithm. The use of planar features can solve this problem to some extent. The applicant thinks that, at present, in algorithms which applied to planar visual positioning, the algorithms for extracting planes are mostly simple and can only be used for simple scenes. The traditional algorithm for extracting planar features is limited by sensors, while the method of extracting planar features from color images by means of deep learning is limited to empirical information, and there are also problems such as scale uncertainty.

The existing algorithm for plane extraction is only based on color image or depth image for plane extraction, which can not achieve very good extraction effect.

SUMMARY

In order to solve the problem that the planar extraction based on the color image or the depth image can not achieve a very good extraction effect, the present application provides a method and an apparatus for pose planar constraining on the basis of planar feature extraction.

In the first aspect, the present application provides a method for pose planar constraining on the basis of planar feature extraction, wherein the method comprises:

inputting the acquired RGB color image and point cloud image into spatial transformation network to obtain two-dimensional and three-dimensional affine transformation matrixes;

extracting the planar features of the transformed two-dimensional affine transformation matrix and three-dimensional affine transformation matrix;

inputting the acquired planar features into the decoder and obtain the pixel classification of the planar features;

clustering the vectors corresponding to the planar pixels to obtain the segmentation result of the planar sample;

using planar fitted by the segmentation result to make planar constraint to the pose calculated by vision algorithm.

Further, extracting the planar features of the transformed two-dimensional affine transformation matrix and three-dimensional affine transformation matrix;

using the two-dimensional affine transformation matrix to rotate the RGB color image, and using the three-dimensional affine transformation matrix to make coordinate transformation to point cloud image;

using the first network to make color feature extracting to the rotated RGB color image, and using the second network to make point cloud feature extracting to the coordinate transformed point cloud image;

fusing high-level features in the extracted color features with the high-level features in the extracted point cloud features, and fusing low-level features in the extracted color features with the low-level features in the extracted point cloud features.

Further, clustering the vectors corresponding to the planar pixels to obtain the segmentation result of the planar sample comprises:

inputting the fused planar features into the decoder and obtain the pixel classification of the planar features and feature vectors of the corresponding position of the planar features;

clustering the planar pixels of the feature vectors of the corresponding position of the planar to obtain the segmentation result of the planar sample;

further, the method also comprises:

using a loss function which is added with regular terms to train and constrain the weight of the planar feature extracting network.

In the second aspect, the present application provides an apparatus for pose planar constraining on the basis of planar feature extraction, wherein the apparatus comprises:

an affine transformation matrix generating module, which is used for inputting the acquired RGB color image and point cloud image into spatial transformation network to obtain two-dimensional and three-dimensional affine transformation matrixes;

a planar features extracting module, which is used for extracting the transformed features of the two-dimensional affine transformation matrix and three-dimensional affine transformation matrix;

a decoder processing module, which is used for inputting the acquired planar features into the decoder and obtaining the pixel classification of the planar features;

a clustering module, which is used for clustering the vectors corresponding to the planar pixels to obtain the segmentation result of the planar sample;

a planar constraint module, which is used for utilizing planar fitted by the segmentation result to make planar constraint to the pose calculated by vision algorithm.

Further, the planar constraint module also comprises:

a rotation and coordinate transformation unit, which is used for using the two-dimensional affine transformation matrix to rotate the RGB color image, and using the three-dimensional affine transformation matrix to make coordinate transformation to point cloud image;

a features extracting unit, which is used for using the first network to make color feature extracting to the rotated RGB color image, and using the second network to make point cloud feature extracting to the coordinate transformed point cloud image;

a features fusing unit, which is used for fusing high-level features in the extracted color features with high-level features in the extracted point cloud features, and fusing low-level features in the extracted color features with low-level features in the extracted point cloud features.

Further, the clustering module also comprises:

a pixel classification and feature vector obtaining unit, which is used for inputting the fused planar features into the decoder and obtain the pixel classification of the planar features and feature vectors of the corresponding position of the planar features;

a segmentation result obtaining unit, which is used for clustering the planar pixels of the feature vectors of the corresponding position of the planar to obtain the segmentation result of the planar sample;

further, the apparatus also comprises:

a training and constraining unit, which is used for using a loss function that is added with regular terms to train and constrain the weight of the planar feature extracting network.

In the third aspect, the present application provides an electronic device, which comprises a memory, a processor and a computer program stored on the memory and operative on the processor, wherein the method for making planar constrain to pose on the basis of planar feature extraction provided by the first aspect is implemented while the processor operating the program.

In the fourth aspect, the present application provides a readable storage medium for non-transient computer, in which a computer program is stored, wherein the method for pose planar constraining on the basis of planar feature extraction provided by the first aspect is implemented while the program being operated by the processor.

The application combines RGB-D information to perform plane extraction, and designs a new spatial transformation network to transform two-dimensional color image and three-dimensional point cloud image. Compared with the existing simple color or depth based method, the model of the present application has the ability to extract information from RGB-D multi-modal input, and has a better effect of extracting the plane. At the same time, applying the planar constrained positioning method to the existing positioning algorithm can effectively improve the positioning accuracy.

BRIEF DESCRIPTION OF THE DRAWINGS

In order to more clearly illustrate the embodiments of the present application or the technical solutions in the prior art, the drawings used for the description of the embodiments or the prior art will be briefly described below. Obviously, the drawings described in the following are only several embodiments of the present application. Other drawings can be obtained from those skilled in the art without any creative work.

DETAILED DESCRIPTION OF THE EMBODIMENTS

In order to make those skilled in the art better understand the present application, the technical solution in the embodiment of the application will be described clearly and completely as follows in combination with the drawings of the embodiment of the application. Obviously, the described embodiments is only one part of the embodiments of the application, not all of the embodiments. All other embodiments obtained by a person skilled in the art based on the embodiments of the present application without departing from the inventive scope shall fall within the scope of the application.

It should be noted that the terms "first", "second" and the like in the specification and claims of the present application and the above-mentioned drawings are used to distinguish similar objects, and are not necessarily used to describe a specific order or order. It should be understood that the data so used may be interchanged where appropriate for better description of the embodiments of the present application herein. In addition, the terms "comprises" and "comprises" and "the" and "the" are intended to cover a non-exclusive inclusion. For example, a process, method, system, product or device that contains a sequence of steps or units need not be limited to those steps or units that are clearly listed, but may include other steps or units that are not clearly listed or inherent to those processes, methods, products, or devices.

It should be noted that the embodiments in the present application and the features in the embodiments may be combined with each other without conflict. The present application will be described in detail as follows with reference to the accompanying drawings.

Figure 1:
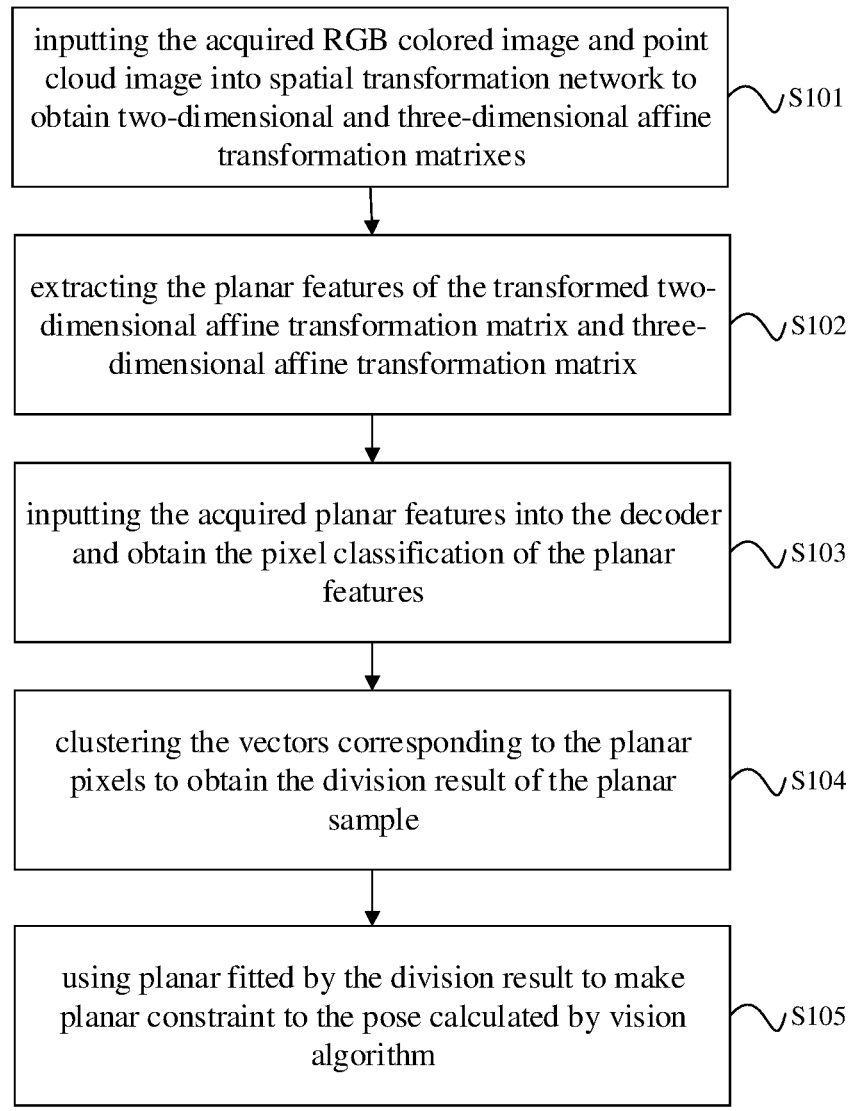
FIG. 1 is a schematic flowchart of the method for pose planar constraining on the basis of planar feature extraction provided by one embodiment of the present application.

At present, in algorithms which applied to planar visual positioning, the algorithms for extracting planes are mostly simple and can only be used for simple scenes. The traditional algorithm for extracting planar features is limited by sensors, while the method of extracting planar features from color images by means of deep learning is limited to empirical information, and there are also problems such as scale uncertainty. In order to solve the above problems, the present application provides a method for pose planar constraining on the basis of planar feature extraction. As shown in FIG. 1, the method includes:

Step S101: inputting the acquired RGB color image and point cloud image into spatial transformation network to obtain two-dimensional and three-dimensional affine transformation matrixes;

Specifically, embodiment of the application relates to the positioning method of the robot. Firstly, the robot camera acquires the RGB color image and point cloud image, and inputs the RGB color image and the point cloud image into a multi-input and multi-output 2d to 3d space transformation network respectively, generating a two-dimensional affine transformation matrix and a three-dimensional affine transformation matrix respectively. In this case, the function of the spatial transformation network is to let the network learn the direction of the input image; the robot camera here adopts RGB-D depth camera technology. RGB-D is a new technology emerging in recent years. In terms of function, it is to add a depth measurement on the function of RGB ordinary camera, and analyze from the technical level of realizing this function.

Step S102: extracting the planar features of the transformed two-dimensional affine transformation matrix and three-dimensional affine transformation matrix;

Specifically, using the two-dimensional affine transformation matrix to rotate the RGB color image, and using the three-dimensional affine transformation matrix to make coordinate transformation to the point cloud image. The coordinate transformation herein is Euclidean transformation, which is equivalent to the overall rotation of the point cloud image. The rotated RGB color image is input into the color feature extraction network, and the point cloud image feature is input into the point cloud feature extraction network, and finally the plane feature extraction is completed.

Step S103: inputting the acquired planar features into the decoder and obtain the pixel classification of the planar features.

Specifically, the obtained plane features are fused among different features, and the fused features are input into the decoder. Among them, the decoder provided by the embodiments of the present application is divided into two decoders, in which one is the decoder used to output the pixel classification probability and the other is the decoder used to output the feature vector corresponding to the position of each plane pixel.

Step S104: clustering the vectors corresponding to the planar pixels to obtain the segmentation result of the planar sample;

Specifically, when the decoder classifies the planar features, the classification of the planar pixels and the non-planar pixels is mainly performed according to the classification probability. For example, if the classification probability is greater than or equal to 0.7, it is classified as plane pixel type; if the classification probability is less than 0.7, it is classified as non plane pixel type. According to the above classification results, the segmentation of a planar sample is completed.

Step S105: using planar fitted by the segmentation result to make planar constraint to the pose calculated by vision algorithm.

Specifically, there are many visual-based simultaneous positioning and mapping and 3D reconstruction algorithms. Although the targets are different, they will locate the current robot (or camera or camera). Visual SLAM algorithms such as ORB-SLAM, LSD-SLAM and so on, 3D reconstruction such as Visual Sfin, bundleFusion and so on, are all suitable for visual positioning algorithms. In the embodiments of the present application, ElasticFusion algorithm, a three-dimensional reconstruction algorithm, is used. That is, the divided plane obtained by segmentation results is used to constrain the estimated pose of ElasticFusion algorithm. The position vector is calculated according to the ElasticFusion algorithm, and the translation vector can be obtained by the position vector. The calculation formula is:

1. When the current frame has a set of non parallel planes matching the reference frame or map:

$$\begin{cases} f(t) = \|t - t_0\|_2^2 \\ At - b = 0 \end{cases}$$

It can be obtained by solving the above equation $$t = t_0 - \frac{b - At_0}{AA^T}$$

wherein t is the translation vector; $t_0$ is the position vector given by the visual positioning algorithm; A is the coefficient matrix; $B = -d_1 + d_2$, where $d_1$ is the parameter value of the plane of the current frame and $d_2$ is the parameter value of the plane of the reference frame.

2. When the current frame has two sets of non parallel planes matching the reference frame or map:

$$\begin{cases} f(t) = \|t - t_0\|_2^2 \\ A_1 t - b_1 = 0 \\ A_2 t - b_2 = 0 \end{cases}$$

It can be obtained by solving the above equation $$t = t_0 - \frac{A_1^T}{2}\lambda_1 - \frac{A_2^T}{2}\lambda_2$$

Wherein $\lambda_1$ and $\lambda_2$ are two parameter values set in accordance with Lagrange multiplier method.

The embodiments of the application combines RGB-D information to perform plane extraction, and designs a new spatial transformation network to transform two-dimensional color image and three-dimensional point cloud image. Compared with the existing simple color or depth based method, the model of the present application has the ability to extract information from RGB-D multi-modal input, and has a better effect of extracting the plane. At the same time, applying the planar constrained positioning method to the existing positioning algorithm can effectively improve the positioning accuracy.

Based on the contents of the above embodiments, as an optional embodiment: extracting the planar features of the transformed two-dimensional affine transformation matrix and three-dimensional affine transformation matrix includes:

using the two-dimensional affine transformation matrix to rotate the RGB color image, and using the three-dimensional affine transformation matrix to make coordinate transformation to point cloud image;

using the first network to make color feature extracting to the rotated RGB color image, and using the second network to make point cloud feature extracting to the coordinate transformed point cloud image;

fusing the high-level features in the extracted color features with the high-level features in the extracted point cloud features, and fusing the low-level features in the extracted color features with the low-level features in the extracted point cloud features.

Specifically, one embodiment of the present application uses the two-dimensional affine transformation matrix to rotate the RGB color image, and uses the three-dimensional affine transformation matrix to make coordinate transformation to point cloud image; Among them, the rotation of RGB color images and coordinate transformation of point-cloud images are helpful to improve the performance of subsequent feature extraction models.

The transformed RGB color images and point cloud images are input into the first network and the second network respectively to complete the color feature extraction and the point cloud feature extraction. The first network is the MobileNet network and the second is the PointNet network. It should be noted that a lighter or a more complex network may be used for replacement according to the actual situation.

Fusing the high-level features in the extracted color features with the high-level features in the extracted point cloud features, fusing the low-level features in the extracted color features with the low-level features in the extracted point cloud features, then high level feature fusion data and low level feature fusion data are obtained respectively. Here, the low-level features and high-level features mean that the current neural network is mostly divided into layers (other layers except the input and output layers, called hidden layers), and each layer receives the output of the upper layer. The hidden layer can be seen as a feature extraction of the input, so the output of these hidden layers is also called a feature. The low-level feature refers to the output of the hidden layer when the number of layers is low, and the high-level feature refers to the output of the hidden layer when the number of layers is high.

In the embodiments of the present application, the feature processing of the RGB color image and the point cloud image can improve the accuracy of the input feature data and improve the robustness of the feature extraction network.

Based on the contents of the above embodiments, as an optional embodiment: clustering the vectors corresponding to the planar pixels to obtain the segmentation result of the planar sample includes:

inputting the fused planar features into the decoder and obtain the pixel classification of the planar features and feature vectors of the corresponding position of the planar features;

clustering the planar pixels of the feature vectors of the corresponding position of the planar to obtain the segmentation result of the planar sample;

Specifically, the decoder provided by the embodiments of the present application is divided into two decoders: a first decoder and a second decoder; when the fused plane features are input into the first decoder, the pixel classification probability can be output, and when the fused plane features are input into the second decoder, the eigenvector corresponding to the position of each plane pixel can be output.

After obtaining the feature vector of the corresponding position of each plane pixel, according to the classification probability result output by the first decoder, the hierarchical clustering algorithm is used to classify the planar pixel and the non-planar pixel for the feature vector, and the segmentation of the planar instance is completed.

Embodiments of the present application complete the classification and the output of feature vectors for planar features according to the decoders, and can cluster the position feature vectors for the output of one decoder according to the classification probability of the output of the other one of the decoders, so that the obtained classification results are more accurate.

Figure 2:
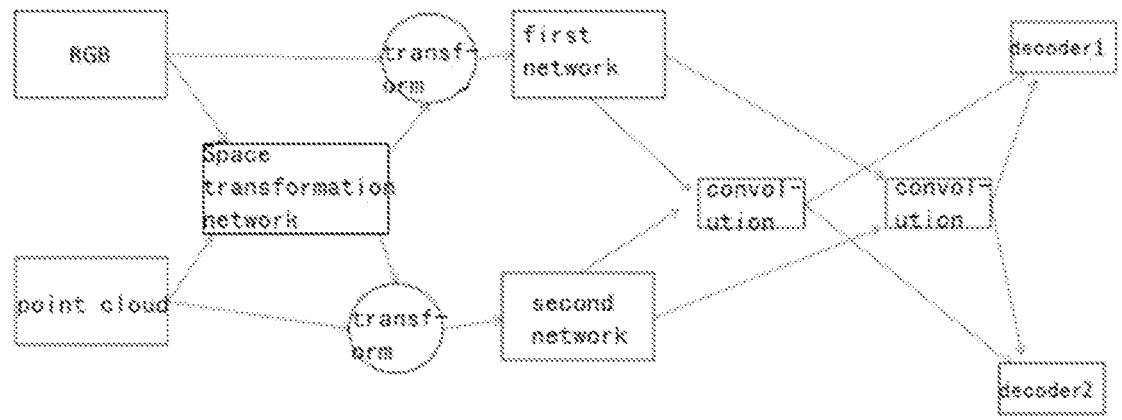
FIG. 2 is a schematic diagram of the planar feature extracting network provided by one embodiment of the present application.

Based on the contents of the above embodiments, as an optional embodiment: as shown in FIG. 2, the specific steps in the figure are:

the acquired RGB color image and point cloud image are input into spatial transformation network;

the spatial transformation network transforms the input RGB color image and the point cloud image;

The spatial transformation network inputs the transformed RGB color image into the first network, and the color feature is extracted, the spatial transformation network inputs the transformed point cloud image into the second network, and the point cloud feature is extracted;

the high-level features in the extracted color features are fused with the high-level features in the extracted point cloud features, and the low-level features in the extracted color features are fused with the low-level features in the extracted point cloud features;

the fused high-level features and low-level features are input to the decoder 1 and the decoder 2, respectively.

The entire steps described above constitute the overall frame of the planar feature extraction network.

Based on the contents of the above embodiments, as an optional embodiment: the method also includes:

using a loss function which is added with regular terms to train and constrain the weight of the planar feature extracting network.

Specifically, treating the entire neural network model as a function f(x;w), w represents some of the parameters in it. Firstly, the value of w is assigned randomly, at this time, the network will generally give an error output, then we use a function to measure the difference between the error output and the correct output, and the used function is called the loss function. The training process of loss function is that the error output will be obtained continuously through continuous input. By constantly adjusting the parameter w in the model, the output of the model can be close to the expected output. At this time, from input to output result then to expected result comparison and adjustment parameters is regarded as an iteration, and the process of repeating the iteration is the training process.

As described herein, by using the loss function to train the weight in the decoder network, and using regularization to optimize and constrain the weight in the loss function network, the output of the network model of plane feature extraction is made to be more in line with the expectation. The two-dimensional affine transformation matrix and the three-dimensional affine transformation matrix are trained by using the loss function after the regularization. The specific formula is as follows:

$$L_{sem}(\hat{y}) = \sum -\alpha(1-\hat{y})^{\gamma}\log(\hat{y}) \quad (1)$$

$$L_{pull} = \frac{1}{C}\sum_{C=1}^{C}\frac{1}{N_c}\sum_{i=1}^{N_c}H(\|u_c - x_i\|) \quad (2)$$

$$L_{push} = \frac{1}{C(C-1)}\sum_{C_A}^{C}\sum_{C_B}^{C\setminus C_A} -H(\|u_{CA} - u_{CB}\|) \quad (3)$$

$$L(A_1, A_2) = \|A_1^T A_1 - I\| + \|A_2^T A_2 - I\| \quad (4)$$

In the above formula, (1) is the loss function for decoder 1 (classification decoder), (2) and (3) are the loss function for decoder 2, (4) is the regularization loss for affine matrix.

Where, $L_{sem}$ in the formula (1) is the loss function of classification, $\hat{y}$ is the output value of the decoder 1, and $\alpha$ is the parameter set artificially; $L_{pull}$ in the formula (2) is the loss function that monitors the output of the decoder 2, u represents the feature vector corresponding to the pixel, subscripts c and i represent the instance, $u_c, x_i$ represents the vector corresponding to the pixel in the instance, H represents the Huber function, and C represents the number of instances, $N_C$ represents the number of pixels contained in the instance; where $L_{push}$ in the formula (3) represents the loss function that monitors the output of the decoder 2, and C represents the set of instances. CA represents an instance, C\CA represents that CA is removed from C; in the formula (4), A1 and A2 respectively correspond to two output matrices of the space transformation network, T represents transpose, and I represents unit matrix.

Figure 3:
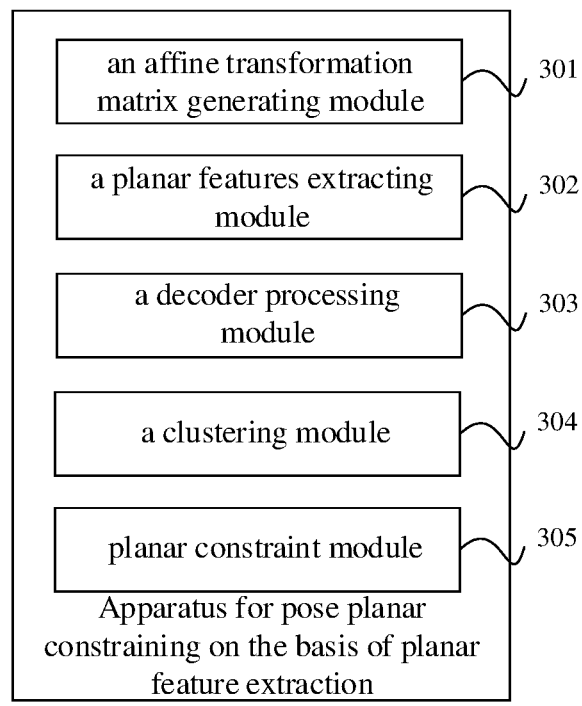
FIG. 3 is a block diagram of an apparatus for pose planar constraining on the basis of planar feature extraction provided by one embodiment of the present application.

According to another aspect of the application, the embodiment of the application provides an apparatus for pose planar constraining on the basis of planar feature extraction, as shown in FIG. 3. FIG. 3 is a block diagram of an apparatus for pose planar constraining on the basis of planar feature extraction provided by one embodiment of the present application. The apparatus is used in the aforementioned embodiments to complete pose planar constraining on the basis of planar feature extraction provided by one embodiment of the present application. Therefore, the description and definition in the method of pose planar constraining on the basis of planar feature extraction provided by the embodiments of the application in the above embodiments can be used for the understanding of each operation module in the embodiments of the application.

The apparatus includes:

an affine transformation matrix generating module 301, which is used for inputting the acquired RGB color image and point cloud image into spatial transformation network to obtain two-dimensional and three-dimensional affine transformation matrixes;

a planar features extracting module 302, which is used for extracting the transformed features of the two-dimensional affine transformation matrix and three-dimensional affine transformation matrix;

a decoder processing module 303, which is used for inputting the acquired planar features into the decoder and obtain the pixel classification of the planar features;

a clustering module 304, which is used for clustering the vectors corresponding to the planar pixels to obtain the segmentation result of the planar sample;

a planar constraint module 305, which is used for utilizing planar fitted by the segmentation result to make planar constraint to the pose calculated by vision algorithm.

Specifically, the specific process for each module in the apparatus of the embodiments to realize its functions can be referred to the relevant description in the corresponding embodiment for method, and will not described herein again.

The embodiments of the application combines RGB-D information to perform plane extraction, and designs a new spatial transformation network to transform the two-dimensional color image and three-dimensional point cloud image. Compared with the existing simple color or depth based method, the model of the present application has the ability to extract information from RGB-D multi-modal input, and a better effect of extracting the plane. At the same time, applying the planar constrained positioning method to the existing positioning algorithm can effectively improve the positioning accuracy.

Based on the contents of the above embodiments, as an optional embodiment: the planar features extracting module includes:

a rotation and coordinate transformation unit, which is used for using the two-dimensional affine transformation matrix to rotate the RGB color image, and using the three-dimensional affine transformation matrix to make coordinate transformation to point cloud image;

a features extracting unit, which is used for using the first network to make color feature extracting to the rotated RGB color image, and using the second network to make point cloud feature extracting to the coordinate transformed point cloud image;

a features fusing unit, which is used for fusing the high-level features in the extracted color features with the high-level features in the extracted point cloud features, and fusing the low-level features in the extracted color features with the low-level features in the extracted point cloud features.

Specifically, the specific process for each module in the apparatus of the embodiments to realize its functions can be referred to the relevant description in the corresponding embodiments for method, and will not described herein again.

In the embodiments of the present application, the feature processing of the RGB color image and the point cloud image can improve the accuracy of the input feature data and improve the robustness of the feature extraction network.

Based on the contents of the above embodiments, as an optional embodiment: the clustering module includes:

a pixel classification and vector obtaining unit, which is used for inputting the fused planar features into the decoder and obtaining the pixel classification of the planar features and feature vectors of the corresponding position of the planar features;

a segmentation result obtaining unit, which is used for clustering the planar pixels of the feature vectors of the corresponding position of the planar to obtain the segmentation result of the planar sample;

Specifically, the specific process for each module in the apparatus of the embodiments to realize its functions can be referred to the relevant description in the corresponding embodiments for method, and will not described herein again.

Embodiments of the present application complete the classification and the output of feature vectors for planar features according to the decoders, and can cluster the position feature vectors for the output of one decoder according to the classification probability of the output of the other one of the decoders, so that the obtained classification results are more accurate.

The apparatus also includes:

a training and constraining unit, which is used for using a loss function that is added with regular terms to train and constrain the weight of the planar feature extracting network.

Specifically, the specific process for each module in the apparatus of the embodiments to realize its functions can be referred to the relevant description in the corresponding embodiments for method, and will not described herein again.

Figure 4:
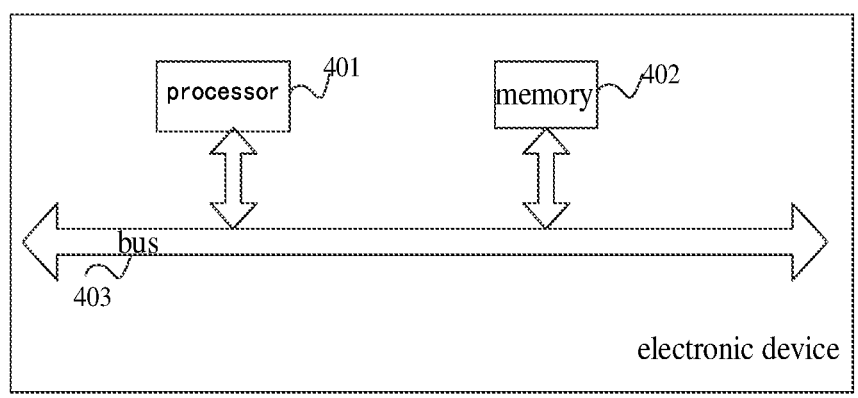
FIG. 4 is a block diagram of an electronic device provided by one embodiment of the present application.

FIG. 4 is a block diagram of an electronic device provided by one embodiment of the present application. As shown in FIG. 4, the device includes a processor 401, a memory 402 and a bus 403;

wherein, the processor 401 and the memory 402 communicate with each other through the bus 403 respectively; the processor 401 is used to call the program instructions in the memory 402 to execute the method of pose planar constraining on the basis of planar feature extraction provided by the above embodiments. For example, the method includes: inputting the acquired RGB color image and point cloud image into spatial transformation network to obtain two-dimensional and three-dimensional affine transformation matrixes; extracting the planar features of the transformed two-dimensional affine transformation matrix and three-dimensional affine transformation matrix; inputting the acquired planar features into the decoder and obtain the pixel classification of the planar features; clustering the vectors corresponding to the planar pixels to obtain the segmentation result of the planar sample; using planar fitted by the segmentation result to make planar constraint to the pose calculated by vision algorithm.

One embodiment of the present application provides a readable storage medium for non-transient computer, in which a computer program is stored, wherein the method for pose planar constraining on the basis of planar feature extraction is implemented while the program being operated by the processor. For example, the method includes: inputting the acquired RGB color image and point cloud image into spatial transformation network to obtain two-dimensional and three-dimensional affine transformation matrixes; extracting the planar features of the transformed two-dimensional affine transformation matrix and three-dimensional affine transformation matrix; inputting the acquired planar features into the decoder and obtain the pixel classification of the planar features; clustering the vectors corresponding to the planar pixels to obtain the segmentation result of the planar sample; using planar fitted by the segmentation result to make planar constraint to the pose calculated by vision algorithm.

The device embodiments described above are merely schematic, in which the units described as separate parts may or may not be physically separated, and the units shown as units may or may not be physical units, that is, they may be located in one place or may be distributed over multiple network units. Some or all of the modules can be selected according to the actual needs to achieve the purpose of the embodiments. Those skilled in the art can understand and implement it without paying creative labor.

Through the description of the above embodiments, those skilled in the art can clearly understand that various embodiments can be implemented by means of software plus a necessary general hardware platform, and of course, by means of hardware. Based on such understanding, the essence of the above technical solution, or the part of its contribution to the existing technology, can be embodied in the form of software products. The software product can be stored in a computer-readable storage medium, such as ROM/ram, disk, optical disk, etc., including a number of instructions for a computer device (may be a personal computer, server, or network device, etc.) to execute various embodiments or some parts of the embodiments.

Finally, the principles and embodiments of the present application have been described in combination with specific embodiments of the present application. The description of the above embodiments is only for the purpose of understanding the method of the present application and its core idea. Meanwhile, for those skilled in the art, according to the idea of the application, there will be changes in specific embodiments and application scope. In conclusion, the content of the specification should not be understood as a limitation of the application.

What is claimed is:

1. A method for pose planar constraining on the basis of planar feature extraction, wherein the method comprises:
    inputting the acquired RGB color image and point cloud image into spatial transformation network to obtain two-dimensional and three-dimensional affine transformation matrixes;
    extracting the planar features of the transformed two-dimensional affine transformation matrix and three-dimensional affine transformation matrix, wherein the extracting of the planar features of the transformed two-dimensional affine transformation matrix and three-dimensional affine transformation matrix comprises: using the two- dimensional affine transformation matrix to rotate the RGB color image, and using the three-dimensional affine transformation matrix to make coordinate transformation to the point cloud image; using the first network to make color feature extracting to the rotated RGB color image, and using the second network to make point cloud feature extracting to the coordinate transformed point cloud image; fusing high-level features in the extracted color features with high-level features in the extracted point cloud features, and fusing low- level features in the extracted color features with low-level features in the extracted point cloud features;
    inputting the acquired planar features into the decoder and obtain the pixel classification of the planar features;
    clustering the vectors corresponding to the planar pixels to obtain the segmentation result of the planar sample;
    using planar fitted by the segmentation result to make planar constraint to the pose calculated by vision algorithm.

2. The method according to claim 1, wherein clustering the vectors corresponding to the planar pixels to obtain the segmentation result of the planar sample comprises:
    inputting the fused planar features into the decoder and obtain the pixel classification of the planar features and feature vectors of the corresponding position of the planar features;
    clustering the planar pixels of the feature vectors of the corresponding position of the planar to obtain the segmentation result of the planar sample.

3. The method according to claim 1, wherein the method also comprises:
    using a loss function which is added with regular terms to train and constrain the weight of the planar feature extracting network.

4. An electronic device, which comprises a memory, a processor and a computer program stored on the memory and operative on the processor, wherein the method for pose planar constraining on the basis of planar feature extraction according to claim 1 is implemented while the processor operating the program.

5. A readable storage medium for non-transient computer, in which a computer program is stored, wherein the method for pose planar constraining on the basis of planar feature extraction according to claim 1 is implemented while the program being operated by the processor.

6. An apparatus for pose planar constraining on the basis of planar feature extraction, wherein the apparatus comprises:
    an affine transformation matrix generating module configured to input the acquired RGB color image and point cloud image into spatial transformation network to obtain two-dimensional and three-dimensional affine transformation matrixes;
    a planar features extracting module configured to extract the transformed features of the two-dimensional affine transformation matrix and three-dimensional affine transformation matrix, wherein the planar features extracting module comprises: a rotation and coordinate transformation unit configured to use the two-dimensional affine transformation matrix to rotate the RGB color image, and to use the three-dimensional affine transformation matrix to make coordinate transformation to the point cloud image; a features extracting unit configured to use the first network to make color feature extracting to the rotated RGB color image, and to use the second network to make point cloud feature extracting to the coordinate transformed point cloud image; a features fusing unit configured to fuse high-level features in the extracted color features with the high-level features in the extracted point cloud features, and to fuse low-level features in the extracted color features with the low-level features in the extracted point cloud features;
    a decoder processing module configured to input the acquired planar features into the decoder and obtain the pixel classification of the planar features;
    a clustering module configured to cluster the vectors corresponding to the planar pixels to obtain the segmentation result of the planar sample;
    planar constraint module configured to for utilize planar fitted by the segmentation result to make planar constraint to the pose calculated by vision algorithm.

7. The apparatus according to claim 6, wherein the clustering module comprises:
    a pixel classification and feature vector obtaining unit configured to input the fused planar features into the decoder and obtaining the pixel classification of the planar features and feature vectors of the corresponding position of the planar features;

a segmentation result obtaining unit configured to cluster the planar pixels of the feature vectors of the corresponding position of the planar to obtain the segmentation result of the planar sample.

8. The apparatus according to claim 6, wherein the apparatus also comprises:

a training and constraining unit configured to use a loss function that is added with regular terms to train and constrain the weight of the planar feature extracting network.

* * * * *